United States Patent
Kaldor

(10) Patent No.: US 10,896,484 B2
(45) Date of Patent: Jan. 19, 2021

(54) METHOD AND SYSTEM OF DISPLAY OBJECT PRE-GENERATION ON WINDOWS OF IDLE TIME AVAILABLE AFTER EACH FRAME BUFFER FILL TASKS

(71) Applicant: Facebook, Inc., Menlo Park, CA (US)

(72) Inventor: Jonathan M. Kaldor, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

(21) Appl. No.: 15/793,309

(22) Filed: Oct. 25, 2017

(65) Prior Publication Data

US 2018/0047136 A1  Feb. 15, 2018

Related U.S. Application Data

(63) Continuation of application No. 14/949,669, filed on Nov. 23, 2015, now Pat. No. 10,354,363, which is a
(Continued)

(51) Int. Cl.
*G06T 3/40* (2006.01)
*G06F 9/48* (2006.01)
(Continued)

(52) U.S. Cl.
CPC .......... *G06T 3/4092* (2013.01); *G06F 3/0481* (2013.01); *G06F 3/14* (2013.01);
(Continued)

(58) Field of Classification Search
CPC .. G06F 2209/5018; G06F 3/0481; G06F 3/14; G06F 9/485; G06F 9/505; G06T 1/20; G06T 1/60; G06T 2200/28; G06T 3/4092
See application file for complete search history.

(56) References Cited

U.S. PATENT DOCUMENTS

| | | |
|---|---|---|
| 5,794,016 A | 8/1998 | Kelleher |
| 6,085,226 A | 7/2000 | Horvitz |
| | (Continued) | |

FOREIGN PATENT DOCUMENTS

| | | |
|---|---|---|
| CN | 101436131 A | 5/2009 |
| CN | 10866285 A | 10/2010 |
| | (Continued) | |

OTHER PUBLICATIONS

Notification of Reasons for Rejection Regarding Application No. 2017-078681 from Japanese Patent Office (English Translation), dated May 8, 2018.
(Continued)

*Primary Examiner* — Jorge A Chu Joy-Davila
(74) *Attorney, Agent, or Firm* — Baker Botts L.L.P.

(57) ABSTRACT

In one embodiment, a computing device determines a window of time that is available after each operation to fill a frame buffer. The device determines a first number indicating a number of elements of a requested content that fit into a display region, an increment based on an application-specific rule, and a second number indicating a number of elements to pre-generate based on the first number and the increment. The device selects one or more pre-generation tasks for pre-generating content for the second number of select elements of the requested content. During the window of time, the device executes at least a subset of the pre-generation tasks to pre-generate content for a corresponding subset of the select elements. The pre-generated subset of the select elements is stored in an application-tailored recycler.

20 Claims, 6 Drawing Sheets

Related U.S. Application Data continuation of application No. 13/861,303, filed on Apr. 11, 2013, now Pat. No. 9,207,986.

(51) Int. Cl.
*G06F 9/50* (2006.01)
*G06F 3/0481* (2013.01)
*G06F 3/14* (2006.01)
*G06T 1/20* (2006.01)
*G06T 1/60* (2006.01)

(52) U.S. Cl.
CPC .............. *G06F 9/485* (2013.01); *G06F 9/505* (2013.01); *G06T 1/20* (2013.01); *G06T 1/60* (2013.01); *G06F 2209/5018* (2013.01); *G06T 2200/28* (2013.01)

(56) References Cited

U.S. PATENT DOCUMENTS

| | | |
|---|---|---|
| 6,182,133 B1 | 1/2001 | Horvitz |
| 6,912,533 B1 | 6/2005 | Hornick |
| 7,430,340 B2 | 9/2008 | Glass |
| 7,840,647 B2 | 11/2010 | Kloba |
| 7,975,019 B1 | 7/2011 | Green |
| 8,327,263 B2 | 12/2012 | Atkinson |
| 8,402,094 B2 | 3/2013 | Yoshida |
| 9,207,986 B2 | 12/2015 | Kaldor |
| 9,760,964 B2 | 9/2017 | Du |
| 2001/0051979 A1 | 12/2001 | Aufricht |
| 2002/0180808 A1 | 12/2002 | Fujita |
| 2004/0064577 A1* | 4/2004 | Dahlin .................. H04L 29/06 709/235 |
| 2004/0205514 A1 | 10/2004 | Sommerer |
| 2004/0255246 A1 | 12/2004 | Douglis |
| 2005/0010877 A1 | 1/2005 | Udler |
| 2006/0107204 A1 | 5/2006 | Epstein |
| 2006/0173572 A1 | 8/2006 | Sagasaki |
| 2006/0242557 A1 | 10/2006 | Nortis, III |
| 2007/0005905 A1* | 1/2007 | Yasue .................... G06F 9/383 711/137 |
| 2007/0061425 A1 | 3/2007 | Yamamoto |
| 2007/0206018 A1 | 9/2007 | Bajic |
| 2007/0297560 A1 | 12/2007 | Song |
| 2008/0212690 A1* | 9/2008 | Loukas ............ H04N 21/23406 375/240.28 |
| 2008/0256002 A1 | 10/2008 | Yoshida |
| 2009/0083700 A1 | 3/2009 | MacPhail |
| 2010/0023690 A1 | 1/2010 | Dewar |
| 2010/0281224 A1 | 11/2010 | Ho |
| 2010/0325579 A1 | 12/2010 | Sandford |
| 2011/0005568 A1 | 1/2011 | Kim |
| 2011/0022611 A1 | 1/2011 | Yorke |
| 2011/0040718 A1 | 2/2011 | Tendjoukian |
| 2011/0055683 A1 | 3/2011 | Jiang |
| 2011/0066999 A1 | 3/2011 | Rabinovich |
| 2011/0202847 A1 | 8/2011 | Dimitrov |
| 2012/0018258 A1 | 1/2012 | Auger |
| 2012/0110435 A1 | 5/2012 | Green |
| 2012/0166433 A1 | 6/2012 | Tseng |
| 2012/0166532 A1 | 6/2012 | Juan |
| 2012/0182581 A1 | 7/2012 | Fujita |
| 2012/0254292 A1 | 10/2012 | Newton |
| 2012/0278704 A1 | 11/2012 | Ying |
| 2012/0284662 A1 | 11/2012 | Kumar |
| 2012/0320069 A1 | 12/2012 | Lee |
| 2013/0013990 A1 | 1/2013 | Green |
| 2013/0290641 A1 | 10/2013 | Corrie |
| 2014/0028089 A1 | 1/2014 | Luke |
| 2014/0095606 A1 | 4/2014 | Matus |
| 2014/0165001 A1* | 6/2014 | Shapiro .................. G06F 16/54 715/811 |

FOREIGN PATENT DOCUMENTS

| | | |
|---|---|---|
| CN | 101866285 A | 10/2010 |
| CN | 101937461 A | 1/2011 |
| CN | 102150175 A | 8/2011 |
| EP | 1513074 | 3/2005 |
| EP | 1513074 A2 | 3/2005 |
| EP | 2023292 A1 | 2/2009 |
| JP | 07219738 | 8/1995 |
| JP | 09-62570 | 3/1997 |
| JP | H0962570 A | 3/1997 |
| JP | 2001-105671 | 4/2001 |
| JP | 2002-175142 | 6/2002 |
| JP | 2007286745 | 1/2007 |
| JP | 2007-265164 | 10/2007 |
| JP | 2012-185836 | 9/2012 |
| JP | 2013-003651 | 1/2013 |
| WO | WO 03029968 A1 | 4/2003 |
| WO | WO2008118613 | 10/2008 |
| WO | WO 2014/157855 A1 | 10/2014 |

OTHER PUBLICATIONS

Examination Report No. 1 for Standard Patent Application No. 2014251235 from Australian Government IP Australia, dated Dec. 11, 2017.
Suparna Bhattacharya et. al, "Reuse, Recycle to Debloat Software", Object Oriented Programming, Springer Berlin, Heidelberg, Jul. 25, 2011.
Zhao, et al., "Allocation Wall: a Limiting Factor of Java Applications of Emerging Multi-core Platforms", Object Oriented Programming Systems Languages and Applications, New York, New York, Oct. 25, 2009.
Notice of Preliminary Rejection for Application No. 10-2015-7032199 from Korean Intellectual Property Office, dated Dec. 27, 2017.
Notification of the First Office Action regarding Application No. 2014800332185 from the State Intellectual Property Office of the People's Republic of China, dated Mar. 2, 2018.
EP Communication received from EPO for Patent Application No. 14785263.6-1222, dated Sep. 11, 2018.
Communication pursuant to Article 94(3) for EP Patent Application No. 14785263.6-1222, dated Mar. 13, 2019.
Japanese Office action Rejection for Application No. 2016-507567 (without English Translation), dated Jan. 9, 2018.
Notice of Preliminary Rejection for KR Patent Application No. 10-2015-7032549 (with English translation), dated Mar. 20, 2019.
CA Office Action received from CAIPO for Patent Application No. 2,909,075, dated Oct. 29, 2018.
AU Office Action received for Patent Application No. 2014254368, dated Nov. 27, 2018.
AU Office Action received for Patent Application No. 2014254368, dated Dec. 3, 2018.
IL OA received for Patent Application No. 248442. (with English Translation), dated May 28, 2018.
CN OA received for Patent Application No. 2014800339269. (with English Translation), dated Jul. 11, 2018.
JP OA received from JPO for Patent Application No. JP2016-508957 (with English Translation), dated May 31, 2018.
Notice of Allowance for Application No. 10-2015-7032199 from Korean Intellectual Property Office (with English Translation), dated Mar. 13, 2018.
Notification of the First Office Action for Application No. 2014-800339269 from the State Intellectual Property Office of the People's Republic of China, dated Jan. 17, 2018.
EP Communication received from EPO for Patent Application No. 14782936.0-1224, dated Jan. 24, 2019.
AU OA received for Patent Application No. 2017210529, dated Aug. 8, 2018.
MX OA received for Patent Application No. MX/a/2015/014580. (with English Translation), dated Jul. 26, 2018.
Dillig, et al., The Closer: Automating Resource Management in Java, Proceedings of the 7th International Symposium on Memory Management, New York, New York. pp. 1-10, Jun. 7, 2008.

(56) References Cited

OTHER PUBLICATIONS

International Search Report and Written Opinion from International Application No. PCT/2014/032786, 9 pages, dated Jun. 27, 2014.
International Search Report and Written Opinion from International Application No. PCT/2014/032823, 11 pages, dated Jul. 17, 2014.
International Search Report and Written Opinion for International Application PCT/2014/032793, dated Aug. 29, 2014.
AU Office Action received for Patent Application No. 2014251233, dated Nov. 25, 2015.
CN Office Action received for Patent Application No. 2014800333099, dated May 30, 2016.
JP Office Action received from the JPO for Patent Application No. 2016-507566, dated Jun. 8, 2016.
KR Notice of Allowance received for Patent Application No. 10-2015-7032173, dated Jun. 28, 2016.
EESR received from the European Patent Office, for European Patent Application No. 14783240.6, dated Sep. 9, 2016.
EESR received from the European Patent Office, for European Patent Application No. 14782936.0, dated Nov. 14, 2016.
EESR received from the EPO, for European Patent Application No. 14785263.6, dated Jan. 2, 2017.
AU Office Action received for Patent Application No. 2016201606, dated Mar. 10, 2017.
AU Notice of Allowance received for Patent Application No. 2014251235, dated Feb. 1, 2018.
Notification of Reasons for Rejection from Japanese Patent Office for Application No. PCT/US2014/032823 (with English Translation), dated Feb. 6, 2018.
Extended European Search Report received from the European Patent Office, for European Patent Application No. 17156820.7-1879/3220264, dated Jul. 9, 2017.
IL Office Action received for Patent Application No. 248442. (with English Translation), dated May 16, 2019.
EP Communication received from EPO for Patent Application No. 17156820.7-1203, dated Feb. 5, 2020.
BR Office Action received from JPO for Patent Application No. BR112015025695-3. (with English Translation), dated Mar. 6, 2020.
BR Office Action received from JPO for Patent Application No. BR112015026009-8. (with English Translation), dated Feb. 6, 2020.
BR Office Action received from JPO for Patent Application No. BR112015026174-4. (with English Translation), dated Mar. 6, 2020.
IN Office Action received for Patent Application No. 6860/CHENP/2015. (with English Translation), dated Jan. 27, 2020.
CN Office Action received for Patent Application No. 201710763691.4. (with English Translation), dated Apr. 20, 2020.
CA Office Action received from CAIPO for Patent Application No. 2,923,183, dated Apr. 21, 2020.
KR Office Action received from KIPO for Patent Application No. 10-2016-7027060. (with English Translation), dated Apr. 29, 2020.
IN Office Action received for Patent Application No. 6929/CHENP/2015. (with English Translation), dated May 27, 2020.
IN Office Action received for Patent Application No. 6881/CHENP/2015. (with English Translation), dated Jun. 1, 2020.

* cited by examiner

METHOD AND SYSTEM OF DISPLAY OBJECT PRE-GENERATION ON WINDOWS OF IDLE TIME AVAILABLE AFTER EACH FRAME BUFFER FILL TASKS

PRIORITY

This application is a continuation under 35 U.S.C. § 120 of U.S. patent application Ser. No. 14/949,669, filed 23 Nov. 2015, which is a continuation under 35 U.S.C. § 120 of U.S. patent application Ser. No. 13/861,303, filed 11 Apr. 2013, issued as U.S. Pat. No. 9,207,986.

TECHNICAL FIELD

This disclosure generally relates to object lifecycle management.

BACKGROUND

When rendering a content layout for a particular display screen where the content extends beyond the displayable region (requiring the user to scroll the content layout to bring content into view), display objects (e.g., ANDROID's View object) and elements of those display objects may be generated in real time by a dedicated UI thread as they come into view when the user scrolls the content. A significant portion of the latency when bringing additional content into view from beyond the displayable region may be due to real-time performance of tasks to generate a display object: measurement (recursive determination of the size requirements of the display object and of each of its elements), layout (assigning a size and position to the display object and then to each of its elements), and generating commands to draw the display object on the screen. This may be a particular problem for operating systems that assign such tasks to a UI thread that is also busy handling other critical operations such as frame buffer fills.

SUMMARY OF PARTICULAR EMBODIMENTS

Particular embodiments achieve pre-generation of display objects by utilizing periods when a UI thread is idle to interpose pre-generation tasks (or logical chunks thereof). In order to facilitate pre-generation of display objects, an application may: monitor a UI thread to identify periods when the UI thread may be idle for a minimum idle time (e.g., 17 ms left before the next frame buffer fill); add one or more pre-generation tasks to a message queue for the UI thread; and execute the pre-generation tasks to completion (if time suffices), or until a yield point is reached and available time left is less than the minimum idle time.

The embodiments described herein may also be performed with sub-elements of a display object, some of which may comprise nested display objects. Particular embodiments may be implemented on any platform that follows the View-Model-ViewModel pattern.

DESCRIPTION OF EXAMPLE EMBODIMENTS

In order to facilitate pre-filling of display objects in a content-aware manner, an application may apply application-specific policies to determine how to selectively pre-fill only those display objects and/or elements of a display object that are most costly to fill.

Prior to receiving a request for a particular section of a content layout to be displayed, the application may select elements of the particular section of the content layout to pre-fill, fill those selected elements, and store the pre-filled elements in a recycler. When the same content element is requested again, the application retrieves the display object from the recycler, encloses it in a wrapper object, and returns the wrapped display object. The embodiments described herein may also be performed with elements of a display object, some of which may comprise nested display objects.

In connection with methods of implementing a recycler, particular embodiments may utilize one or more systems, components, elements, functions, methods, operations, or steps disclosed in U.S. patent application Ser. No. 13/861,250, filed 11 Apr. 2013 and entitled "Application-Tailored Object Recycling," which is incorporated herein by reference.

Figure 1A:
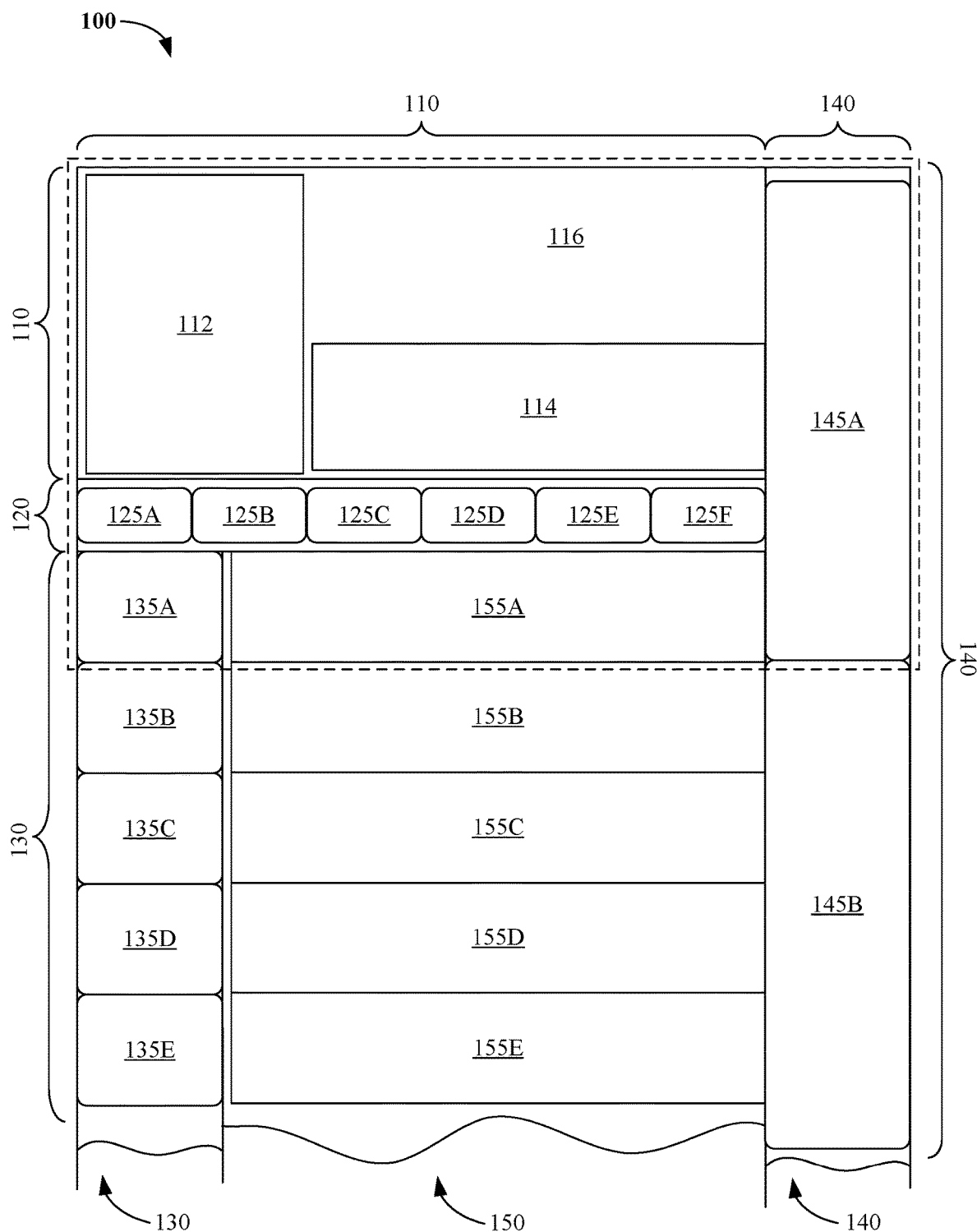
FIG. 1A is a wireframe of a content layout rendered using display objects.

FIG. 1A is a wireframe illustrating an example wireframe of a content layout 100 a newsfeed page for a user of a social-networking system that is rendered for display on a tablet device based on a number of display objects. The displayable region of content layout 100 (indicated by the dashed line) includes the portion of content layout 100 that will fit within the screen dimensions of the tablet device (above the fold).

Content layout 100 includes a header region 110, a menu bar 120, a left-hand sidebar 130, a right-hand sidebar 140, and a main body area 150. Each region is associated with its own display object, each of which may include a number of elements such as, by way of example and not limitation: image(s), video, text, links, forms, and interactive elements. Each of these elements may be represented by one or more nested display objects.

The display object associated with header region 110 includes an interactive profile photo 112 of the social-network user, text block 114, a background image 116, and theme music selected by the social-network user. Interactive profile photo 112 is rendered based on a display object that may include an image, text, a link, and Javascript code to render a pop-up window displaying a summary of a profile of the social-network user that appears when a pointing device, such as a mouse, hovers over the profile photo.

The display object associated with menu bar 120 includes five menu options 125A-F, each of which comprises an image, text, and a link.

The display object associated with left-hand sidebar 130 includes content for a mix of recommendations (including sponsored stories) (only 135A-E are shown, but there may be many more recommendations), each of which is rendered based on a display object. Each display object for a recommendation may include an interactive image, a title, text for the recommendation, and a link to obtain further information related to the recommendation. Each display object for a newsfeed item may also include one or more images or a video The display object associated with right-hand sidebar 140 includes content for one or more advertisements 145, each of which is rendered based on a display object. As illustrated in the example shown in FIG. 1A, advertisement 145A appears above the fold, whereas 145B is not yet in view. The content of the advertisement may be determined at least in part by a third-party advertiser.

The display object associated with main body area 150 includes a number of newsfeed items (only 155A-E are shown, but there may be many more newsfeed items), each of which is rendered based on a display object associated with an activity related to friend (i.e., social-graph connection) of the user.

Figure 1B:
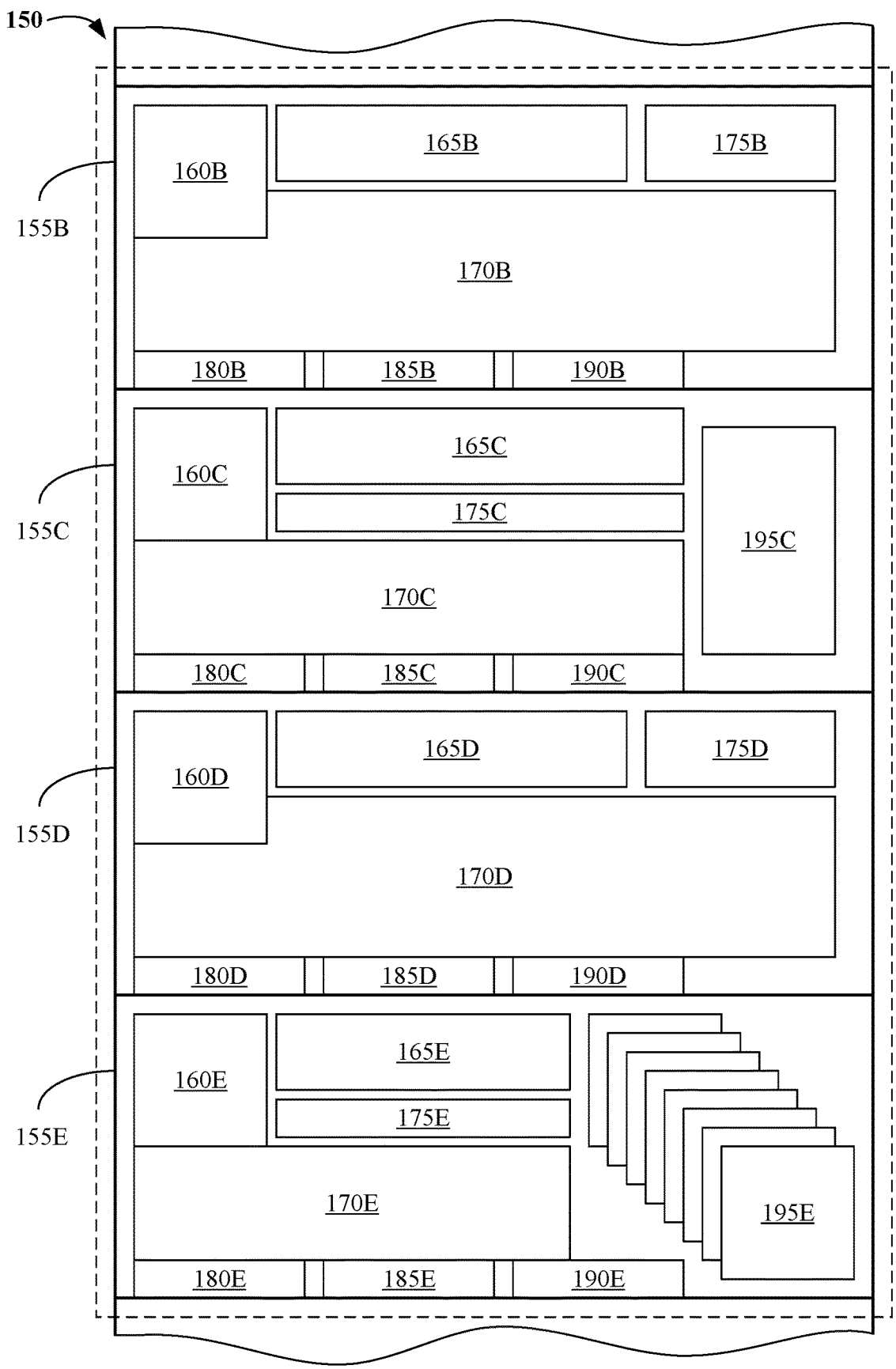
FIG. 1B is a wireframe illustrating a detailed section of FIG. 1A.

FIG. 1B is a wireframe illustrating a detailed section of FIG. 1A: newsfeed items 155B-E in the main body area 150 of content layout 100. As indicated in FIG. 1A, the displayable region of content layout 100 (indicated by the dashed line) includes the portion of content layout 100 that will fit onto the screen of the tablet device.

Each display object for a newsfeed item 155 may include an interactive profile photo of the friend 160, a name of the friend 165, text for the newsfeed item 170, time-sensitive information 175 (e.g., a constantly-updating count of the number of people who have viewed/commented on/"Liked" the listing, a short listing of the most recent one or two people who viewed/commented on/"Liked" the listing, etc.), a link to "Like" the newsfeed item 180, a link to comment on the newsfeed item 185, and a link to "Share" the newsfeed item 190. Each display object for a newsfeed item may also include one or more images 195 or a video.

Each interactive profile photo 160 is rendered based on a display object that may include an image, text, a link, and Javascript code to render a pop-up window displaying a summary of a profile of the social-network user that appears when a pointing device, such as a mouse, hovers over the profile photo.

Figure 2:
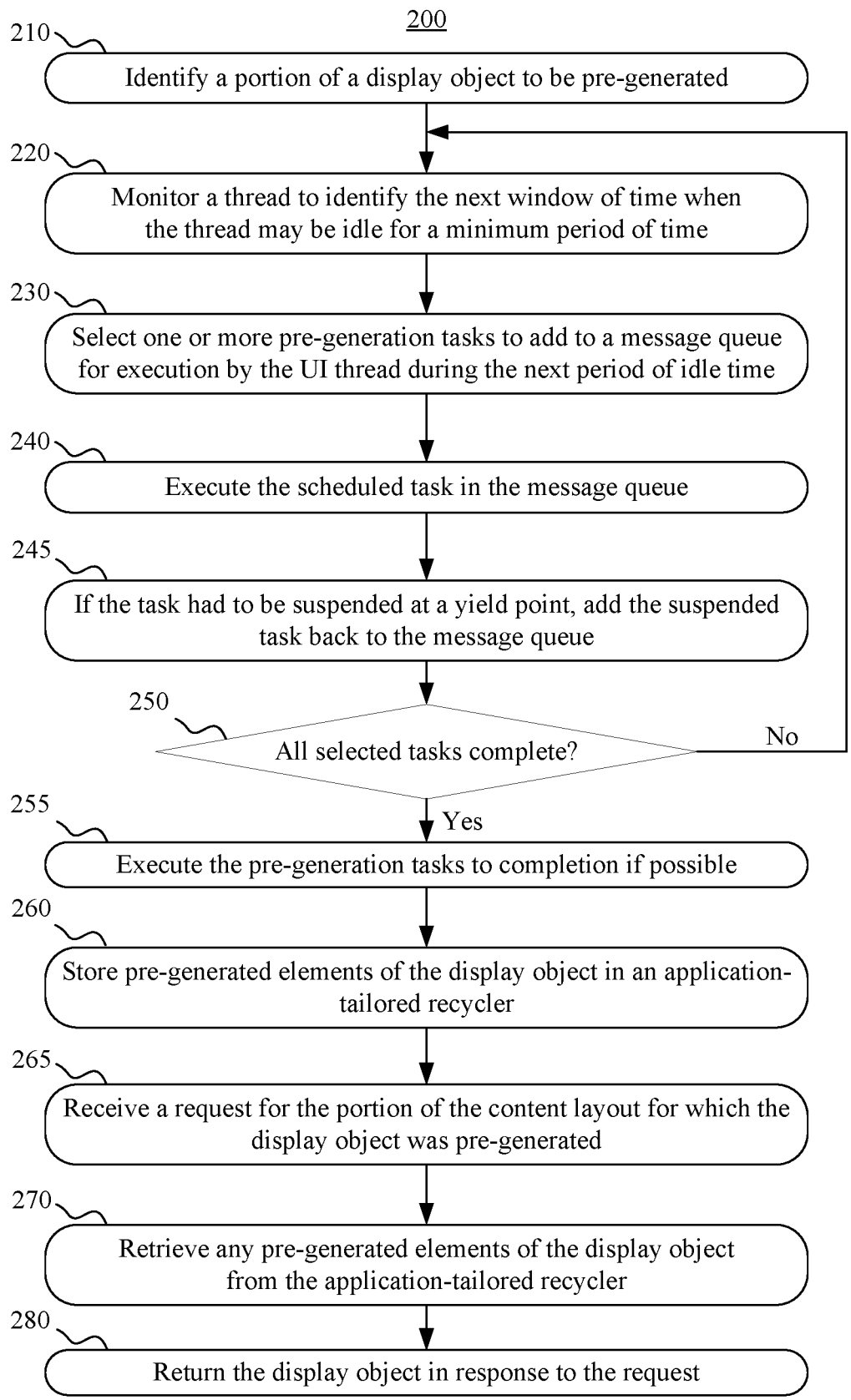
FIG. 2 illustrates an example method for application-tailored object pre-filling.

FIG. 2 illustrates an example method for application-controlled pre-filling of display objects. In step 210, the application may identify a portion of a display object to pre-generate. For example, the display object may comprise a content layout object for a newsfeed, as illustrated in FIG. 1A, including a long list of newsfeed elements 155, as illustrated in FIG. 1B. The portion of the display object identified for pre-generation may comprise the next set of newsfeed elements 155 that would fill the displayable region if the user were to scroll down by hitting the "Page Down" button.

In step 220, the application may monitor a UI thread to identify the next window of time when the UI thread may be idle for a minimum period of time. For example, if the application is running on top of an operating system for a mobile computing device with a screen refresh rate of 60 Hz (or 60 frames/second), then the operating system may need to complete a frame buffer fill every 16.67 ms. If the computing device can complete the frame buffer fill in 12 ms, that leaves a window of 4.67 ms that will arise every 16.67 ms (at the completion of operations to fill the frame buffer). The minimum period of time may be the smallest useful period of time that could be used for the greatest number of tasks that are likely to arise, based at least on the content layout.

In step 230, the application may select one or more pre-generation tasks to add to a message queue for execution by the UI thread during the next period of idle time. In particular embodiments, the application may group together several tasks that may be quickly executed, wherein the total execution time for the one or more pre-generation tasks is less than the time available in the next window of time. The anticipated execution time for any given task may be set at a pre-determined estimate, or it may be learned over time, given sufficient historical data based on an individual user or a group of users. In particular embodiments, where the next task to be performed will take longer than the time available in the next window of time, the application may simply add the task to the message queue, with the expectation that the task may be suspended at a yield point.

In particular embodiments, the application may select particular elements of the display object to pre-generate, based on the dimensions of the displayable region, the available memory, and application-specific rules. In particular embodiments, particularly with respect to list-based or grid-based content layouts the application-specific rules may set an increment by which to pre-generate elements.

The increment may be a multiple of a unit defined by the number of list or grid items that will fit into the dimensions of the displayable region. For example, as shown in FIG. 1B, four newsfeed items may fill a vertical dimension of the displayable region, where the content layout may extend in the vertical dimension (but not the horizontal dimension). In this example, the application-specific rules determine that the unit comprises four newsfeed items (since that is what will fill out the displayable region), and determine that the increment by which to pre-generate elements is three, so that when the application responds to a request to display newsfeed items 155B-E, it also pre-fills selected elements for the next twelve newsfeed items. In particular embodiments, the multiple may be based on user-specific usage patterns. For example, if a user typically scrolls through the newsfeed fairly slowly, then the multiple may be a smaller number. Conversely, if the user typically scrolls through the newsfeed fairly quickly, then the multiple may be a larger number. In particular embodiments, the multiple may also be based on attributes of the content for the list or grid elements. For example, if the content is of a type that is very rich and may likely take the user longer to browse through (e.g., thumbnails of videos that play as the user mouses over each one), then the multiple may be reduced.

In particular embodiments, the application-specific rules may prioritize selection of elements of the display object that are more costly to generate. The cost of generating an element may be determined on any applicable basis, e.g., size of the element, complexity of the element (e.g., is the element a nested display object?), how frequently the element must be updated, capabilities and configuration of the platform (e.g., does the device lack support for or prohibit execution of client-side scripts, which necessitates substitution with alternate, simpler content?), etc.

In particular embodiments, the application-specific rules may select elements of the display object based on available memory. For example, if there is not much available memory, the application may choose to pre-generate only the most costly elements, whereas if there was more available memory, it might pre-generate additional (somewhat less costly elements). In another example, if there is not much available memory, the application may choose to pre-generate those elements that are likely to be re-used very often, e.g., if the next ten newsfeed items are all related to people who have posted the same complex link (which includes an image, text, a link, and other information) to a popular online article, the element representing the complex link may receive priority above other elements.

In step 240, the application may execute the scheduled task in the message queue. In particular embodiments, the scheduled task may relate to measurement and/or layout of elements of the display object. In particular situations where the next task to be performed will take longer than the time available in the next window of time, the application may suspend execution of the task at a yield point in order to allow the UI thread to handle other operations in its queue (e.g., the next frame buffer fill) without significant delay.

In step 245, if the task had to be suspended at a yield point, the application may add the suspended task back to the message queue for the UI thread so that it can be taken up again at the next window of availability. Alternatively, if there are additional pre-generation tasks to be performed, the application may return to step 220 in order to schedule the next task(s).

In step 250, if there are still some selected tasks remaining to be executed, return to step 220, otherwise, if possible (step 255), the application may execute the pre-generation tasks to completion (if there is sufficient time before a request is received for the portion of the content layout that was pre-generated).

In step 260, the application may store pre-generated elements of the display object in an application-tailored recycler. These stored elements may be retained in the recycler until the relevant portion of the content layout is requested for the displayable region.

In step 265, once a request is received for the portion of the content layout for which the display object was pre-generated, the application may retrieve any pre-generated elements of the display object from the application-tailored recycler (step 270). However, since the recycler may contain previously-used display objects and elements thereof as well as pre-generated display objects and elements thereof, particular embodiments may apply application-tailored recycling policies to identify which display objects and elements thereof in the recycler are suitable for re-use, which may include those that were pre-generated.

A display object in the recycler may be suitable for re-use if it contains the same or similar content as that which is currently being requested. In order to re-use the retrieved display object, it may be necessary to update particular elements of the display object as needed. Even for a display object that was pre-generated, it may be necessary to at least update certain time sensitive elements, depending on how long it took the user to scroll.

A display object in the recycler may be suitable for recycling if it is the same type of object but contains different content. In this case, the application may generate the display object in real time with the requested content from scratch (which should not be necessary for any pre-generated display objects or elements thereof), thereby overwriting most if not all of the existing content in the display object.

The determination of which display objects and elements are suitable for re-use, recycling, or neither may be dependent upon application-specific, device-specific, and/or user-specific recycling policies. In particular embodiments, an application may set recycling policies in accordance with application requirements, content types, device attributes (e.g., available memory and/or dimensions of a display screen.), content statistics, usage patterns and preferences, or any other appropriate factor(s). Such policies may govern how many objects to retain in the recycler, what types of objects to store in the recycler, how to determine whether a display object is suitable for re-use and/or re-cycling, when to re-use versus recycle a display object, etc.

If the recycler returns a null, the application inflates a new display object of an appropriate type to display the requested content, and then generates the display object with the requested content. This is the most expensive path, since both inflating a new display object and generating an empty display object are costly operations. Therefore, an application may need to balance conflicting priorities when determining when to prohibit recycling of otherwise suitable display objects stored in the recycler.

In step 280, the application may complete the process of generating the display object as needed for the displayable region and return the display object in response to the request.

Embodiments disclosed herein are described as being performed with respect to elements of a display object—however, in particular embodiments, the techniques described herein may be applied in a recursive fashion to certain elements of a display object (which may themselves be display objects) in order to pre-fill a portion or all of those elements.

Embodiments disclosed herein are described as being performed by an application; however, as one of skill in the art would be aware, many of the steps in example method 200 and other embodiments disclosed herein may be performed by one or more pieces of software operating at one or more layers of abstraction. For example, the steps of the example method described above may be performed by software that executes separately from the application and interfaces with the application and the recycler.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
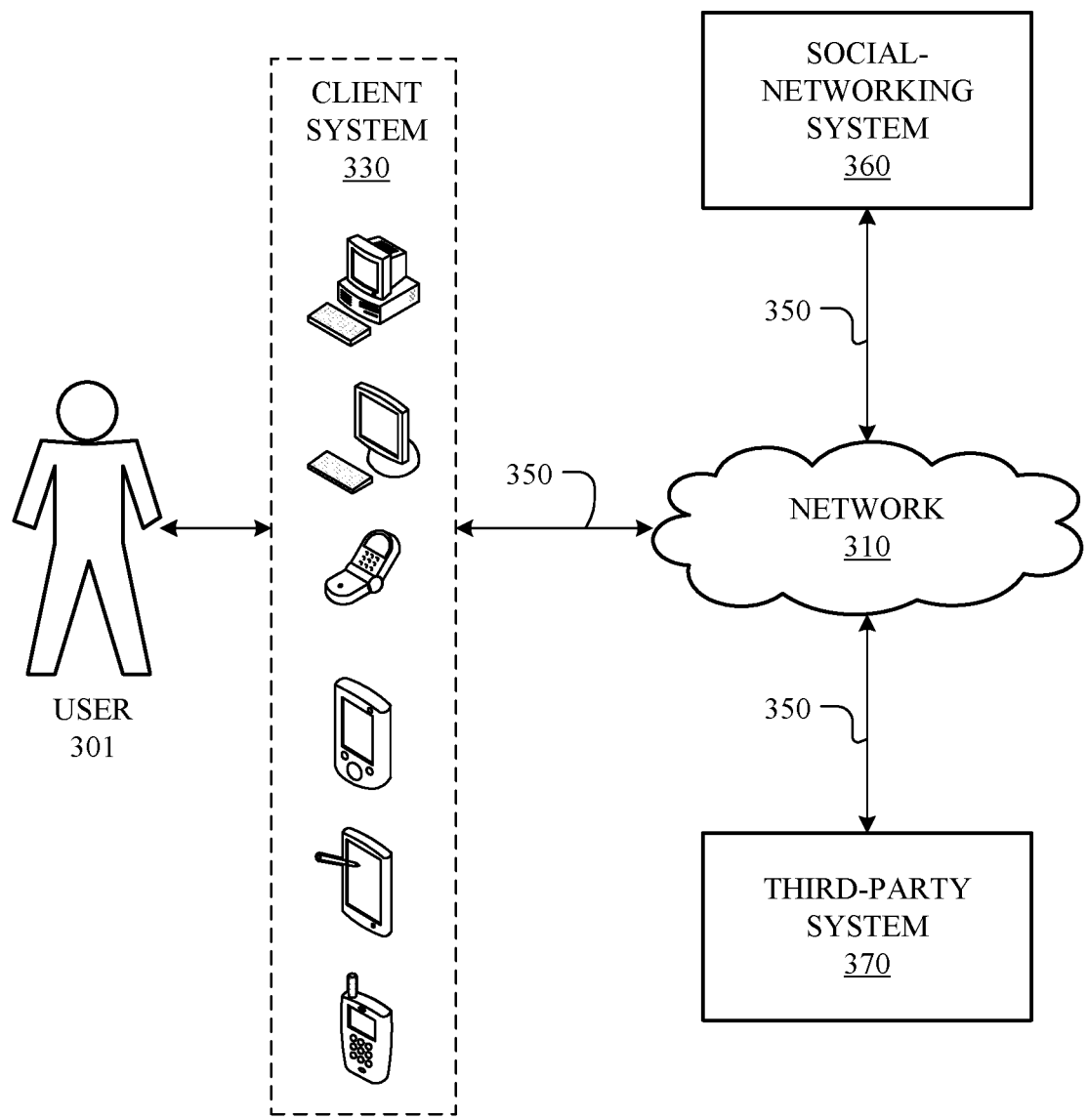
FIG. 3 illustrates an example network environment associated with a social-networking system.

FIG. 3 illustrates an example network environment 300 associated with a social-networking system. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370, and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server (or other suitable component(s)) that allows users 301 to opt in to or opt out of having their actions logged by social-networking system 360 or shared with other systems (e.g., third-party systems 370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360. Client system 330 may be any suitable computing device, such as, for example, a personal computer, a laptop computer, a cellular telephone, a smartphone, or a tablet computer.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
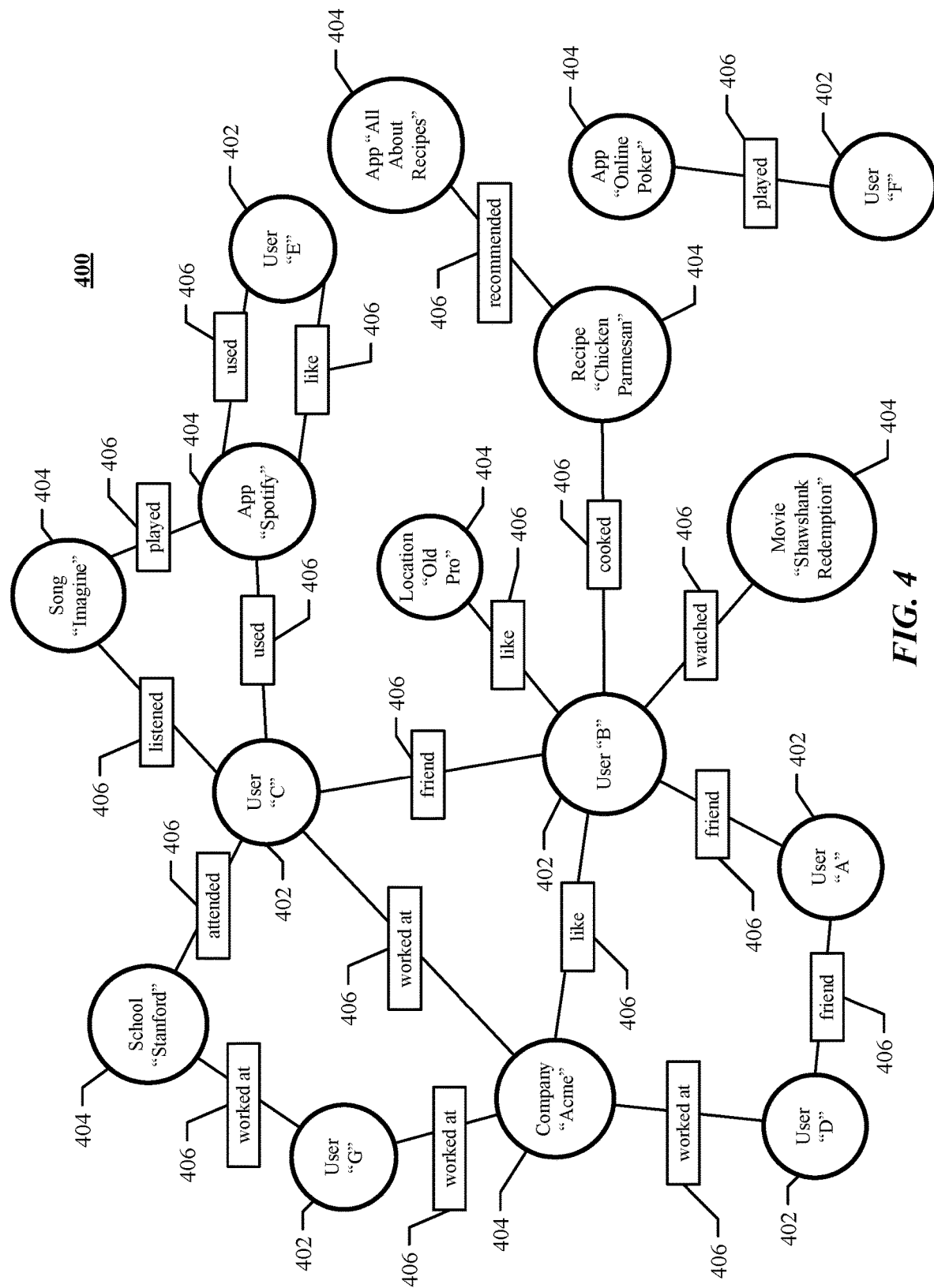
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party server 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 330 to send to social-networking system 360 a message indicating the user's action. In response to the message, social-networking system 360 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 360). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

Figure 5:
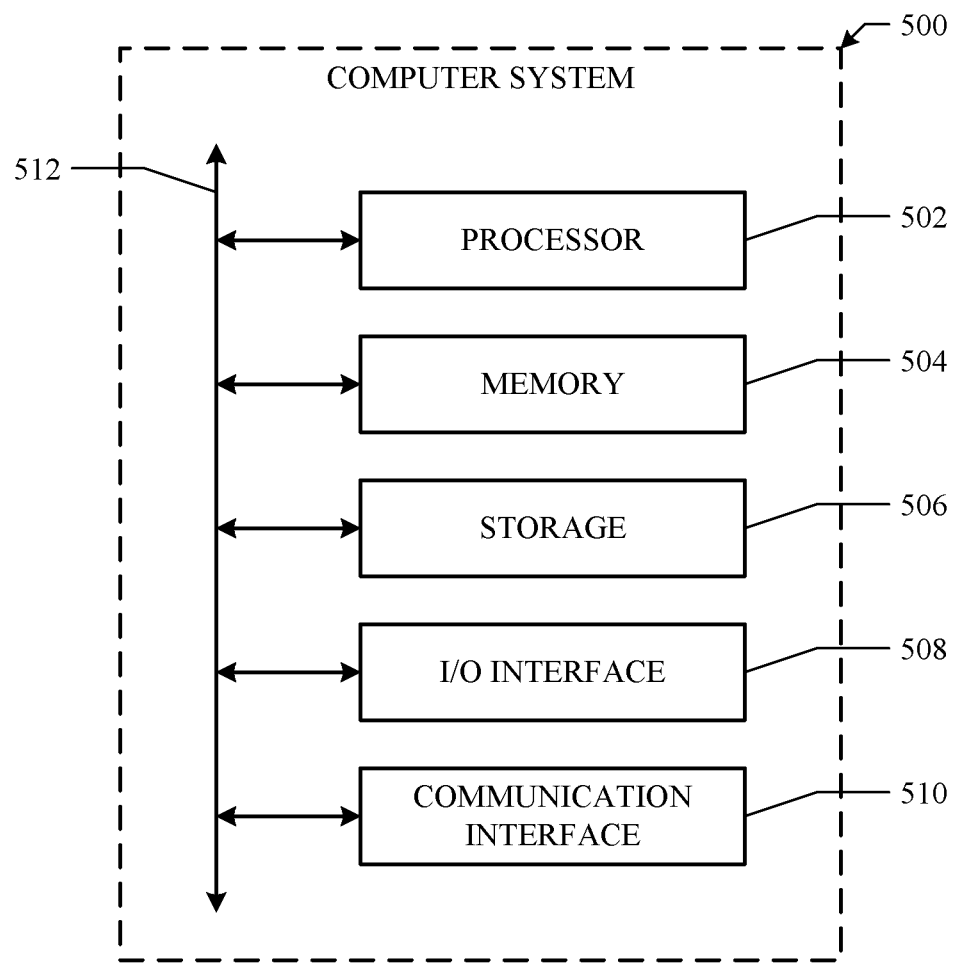
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method executed by a computing device comprising:
   identifying a start point and a yield point of a window of idle time that is available after each frame buffer fill task for a displayable region;
   determining that the window of idle time that is available after each frame buffer fill task is more than a predetermined minimum time period required for executing a pre-generation process comprising pre-generating one or more display elements for a requested content that is currently not visible and is outside of the displayable region;
   determining a first number indicating a number of display elements of the requested content that fit into the displayable region;
   determining an increment based on an application-specific rule;
   determining a second number indicating a number of display elements to pre-generate based on the first number and the increment;
   selecting one or more pre-generation tasks for pre-generating content for the second number of display elements of the requested content;
   in response to the determination that the window of idle time that is available after each frame buffer fill task is more than the predetermined minimum time period required for pre-generating the one or more display elements of the requested content, starting, at the start point of the window of idle time, the pre-generation process for executing the one or more pre-generation tasks, wherein a pre-generation task for pre-generating content during the window of idle time is different from the frame buffer fill task;
   executing, during the pre-generation process, a subset of the one or more pre-generation tasks to pre-generate content for a corresponding subset of the display elements;
   stopping, at the yield point, the pre-generation process before completing the one or more pre-generation tasks in response to the pre-generation process taking longer than the window of idle time, wherein one or more stopped pre-generation tasks are added to a queue to continue execution in the window of idle time after a next frame buffer fill task; and
   storing the pre-generated subset of the display elements in an application-tailored recycler.

2. The method of claim 1, wherein the application-specific rule comprises that the increment is associated with a multiple number of the first number, wherein the increment is determined based on a scroll speed of a user.

3. The method of claim 1, wherein the application-specific rule comprises that the increment is determined based on attributes of the requested content.

4. The method of claim 3, wherein the attributes are associated with display types of the one or more display elements of the requested content.

5. The method of claim 1, further comprising:
   prioritizing one of the display elements for pre-generation based on a computational cost of generating the display element.

6. The method of claim 1, further comprising:
   prioritizing one of the display elements for pre-generation based on a number of times content referenced by the display element is also referenced by other display elements in the one or more display elements.

7. The method of claim 1, wherein the one or more display elements are selected for pre-generation based on a determination that a total execution time for the one or more pre-generation tasks is less than the window of idle time.

8. One or more computer-readable non-transitory storage media embodying software that is operable when executed to:
- identify a start point and a yield point of a window of idle time that is available after each frame buffer fill task for a displayable region;
- determine that the window of idle time that is available after each frame buffer fill task is more than a predetermined minimum time period required for executing a pre-generation process comprising pre-generating one or more display elements for a requested content that is currently not visible and is outside of the displayable region;
- determine a first number indicating a number of display elements of the requested content that fit into the displayable region;
- determine an increment based on an application-specific rule;
- determine a second number indicating a number of display elements to pre-generate based on the first number and the increment;
- select one or more pre-generation tasks for pre-generating content for the second number of display elements of the requested content;
- in response to the determination that the window of idle time that is available after each frame buffer fill task is more than the predetermined minimum time period required for pre-generating the one or more display elements of the requested content, start, at the start point of the window of idle time, the pregeneration process for executing the one or more pre-generation tasks, wherein a pre-generation task for pre-generating content during the window of idle time is different from the frame buffer fill task;
- execute, during the pre-generation process, a subset of the one or more pre-generation tasks to pre-generate content for a corresponding subset of the display elements;
- stop, at the yield point, the pre-generation process before completing the one or more pre-generation tasks in response to the pre-generation process taking longer than the window of idle time, wherein one or more stopped pre-generation tasks are added to a queue to continue execution in the window of idle time after a next frame buffer fill task; and
- store the pre-generated subset of the display elements in an application-tailored recycler.

9. The media of claim 8, wherein the application-specific rule comprises that the increment is associated with a multiple number of the first number, wherein the increment is determined based on a scroll speed of a user.

10. The media of claim 8, wherein the application-specific rule comprises that the increment is determined based on attributes of the requested content.

11. The media of claim 10, wherein the attributes are associated with display types of the one or more display elements of the requested content.

12. The media of claim 8, wherein the software is further operable when executed to: prioritize one of the display elements for pre-generation based on a computational cost of generating the display element.

13. The media of claim 8, wherein the software is further operable when executed to:
- prioritize one of the display elements for pre-generation based on a number of times content referenced by the display element is also referenced by other display elements in the one or more display elements.

14. The media of claim 8, wherein the one or more display elements are selected for pre-generation based on a determination that a total execution time for the one or more pre-generation tasks is less than the window of idle time.

15. A system comprising:
- one or more processors; and
- one or more computer-readable non-transitory storage media coupled to one or more of the processors and comprising instructions operable when executed by one or more of the processors to cause the system to:
- identify a start point and a yield point of a window of idle time that is available after each frame buffer fill task for a displayable region;
- determine that the window of idle time that is available after each frame buffer fill task is more than a predetermined minimum time period required for executing a pre-generation process comprising pre-generating one or more display elements for a requested content that is currently not visible and is outside of the displayable region;
- determine a first number indicating a number of display elements of the requested content that fit into the displayable region;
- determine an increment based on an application-specific rule;
- determine a second number indicating a number of display elements to pre-generate based on the first number and the increment;
- select one or more pre-generation tasks for pre-generating content for the second number of display elements of the requested content;
- in response to the determination that the window of idle time that is available after each frame buffer fill task is more than the predetermined minimum time period required for pre-generating the one or more display elements of the requested content, start, at the start point of the window of idle time, the pregeneration process for executing the one or more pre-generation tasks, wherein a pre-generation task for pre-generating content during the window of idle time is different from the frame buffer fill task;
- execute, during the pre-generation process, a subset of the one or more pre-generation tasks to pre-generate content for a corresponding subset of the display elements;
- stop, at the yield point, the pre-generation process before completing the one or more pre-generation tasks in response to the pre-generation process taking longer than the window of idle time, wherein one or more stopped pre-generation tasks are added to a queue to continue execution in the window of idle time after a next frame buffer fill task; and
- store the pre-generated subset of the display elements in an application-tailored recycler.

16. The system of claim 15, wherein the application-specific rule comprises that the increment is associated with a multiple number of the first number, wherein the increment is determined based on a scroll speed of a user.

17. The system of claim 15, wherein the application-specific rule comprises that the increment is determined based on attributes of the requested content.

18. The system of claim 15, wherein the processors are further operable when executing the instructions to:
- prioritize one of the display elements for pre-generation based on a computational cost of generating the display element.

19. The system of claim 15, wherein the processors are further operable when executing the instructions to:

prioritize one of the display elements for pre-generation based on a number of times content referenced by the display element is also referenced by other display elements in the one or more display elements.

20. The system of claim 15, wherein the one or more display elements are selected for pre-generation based on a determination that a total execution time for the one or more pre-generation tasks is less than the window of idle time.

* * * * *